(12) United States Patent
Jung (10) Patent No.: US 8,165,055 B2
(45) Date of Patent: Apr. 24, 2012

(54) APPARATUS AND METHOD FOR TRANSMITTING AND RECEIVING TIME STAMP TO PROVIDE MULTICAST SERVICE IN COMMUNICATION SYSTEM

(75) Inventor: Young-Ho Jung, Goyang-si (KR)

(73) Assignee: University-Industry Cooperation Foundation of Korea Aerospace University, Goyang-si (KR)

( * ) Notice: Subject to any disclaimer, the term of this patent is extended or adjusted under 35 U.S.C. 154(b) by 512 days.

(21) Appl. No.: 12/475,085

(22) Filed: May 29, 2009

(65) Prior Publication Data

US 2009/0323576 A1 Dec. 31, 2009

(30) Foreign Application Priority Data

Jun. 30, 2008 (KR) .................. 10-2008-0063109
May 29, 2009 (KR) .................. 10-2009-0047642

(51) Int. Cl.
*H04H 20/71* (2008.01)
*H04J 3/26* (2006.01)
*G06F 15/16* (2006.01)
*H04N 7/173* (2011.01)

(52) U.S. Cl. .......... 370/312; 370/432; 709/231; 725/93; 725/100

(58) Field of Classification Search .................. None
See application file for complete search history.

(56) References Cited

U.S. PATENT DOCUMENTS 7,240,105 B2 * 7/2007 Satran et al. .................. 709/222
2007/0054625 A1    3/2007 Beale
2007/0086460 A1    4/2007 Choi et al.
2009/0198827 A1 *  8/2009 Hughes .......................... 709/231
2009/0276820 A1 * 11/2009 Amento et al. ............... 725/116
2009/0328115 A1 * 12/2009 Malik ............................. 725/93

FOREIGN PATENT DOCUMENTS

KR    10-2007-0041300 A    4/2007
KR       10-0738043 B1    7/2007
KR    10-2008-0040773 A    5/2008

* cited by examiner

*Primary Examiner* — Nittaya Juntima
(74) *Attorney, Agent, or Firm* — Jefferson IP Law, LLP (57) ABSTRACT

A method and apparatus for transmitting a time stamp to provide a multicast service by a base station in a communication system is provided. Upon receipt of a multicast service request from a first terminal, the base station determines whether a second terminal exists that was receiving data of the multicast service before the multicast service request is received. The base station determines whether the multicast service data is being transmitted to the second terminal in a unicast manner when the second terminal exists. The base station allocates a first multicast Connection Identifier (CID) and a first time stamp of an earliest order to the second terminal when the multicast service data is being transmitted to the second terminal in a unicast manner. After allocating the first time stamp to the second terminal, the base station allocates the first multicast CID and a second time stamp having a next earliest order to the first terminal. The base station transmits the first time stamp and the second time stamp using a resource allocation message. The first time stamp and the second time stamp represent different playback times of the multicast service data.

22 Claims, 5 Drawing Sheets

FIG.1
(RELATED ART)

| 00 | 01 | 10 | 11 |
|----|----|----|----|
| O  |    |    | X  |
| O  |    | X  | X  |
| O  | X  | X  | X  |
| O  | X  | X  | X  |
| X  | O  |    |    |
| X  | O  |    | X  |
| X  | O  | X  |    |
| X  | O  | X  | X  |
|    | X  | O  |    |
| X  | X  | O  |    |
|    | X  | O  | X  |
| X  | X  | O  | X  |
|    |    | X  | O  |
|    | X  | X  | O  |
| X  |    | X  | O  |
| X  | X  | X  | O  |

FIG.2

| 300 | | | | | |
|---|---|---|---|---|---|
| 000 | 001 | 010 | 011 | 100 | 101 |
| O | | | | | X |
| O | | | | X | X |
| O | | | X | | X |
| O | | X | | | X |
| O | X | | | | X |
| O | | | X | X | X |
| O | | X | | X | X |
| O | X | | | X | X |
| O | | X | X | | X |
| O | X | | X | | X |
| O | X | X | | | X |
| O | | X | X | X | X |
| O | X | | X | X | X |
| O | X | X | | X | X |
| O | X | X | X | | X |
| O | X | X | X | X | X |

| 310 | | | | | |
|---|---|---|---|---|---|
| 000 | 001 | 010 | 011 | 100 | 101 |
| X | O | | | | |
| X | O | | | | X |
| X | O | | | X | |
| X | O | | X | | |
| X | O | X | | | |
| X | O | | | X | X |
| X | O | | X | | X |
| X | O | X | | | X |
| X | O | | X | X | |
| X | O | X | | X | |
| X | O | X | X | | |
| X | O | | X | X | X |
| X | O | X | | X | X |
| X | O | X | X | | X |
| X | O | X | X | X | |
| X | O | X | X | X | X |

APPARATUS AND METHOD FOR TRANSMITTING AND RECEIVING TIME STAMP TO PROVIDE MULTICAST SERVICE IN COMMUNICATION SYSTEM

PRIORITY

This application claims the benefit under 35 U.S.C. §119(a) of Korean Patent Applications filed in the Korean Intellectual Property Office on Jun. 30, 2008 and May 29, 2009, and assigned Serial Nos. 10-2008-0063109 and 10-2009-0047642, the entire disclosures of which are hereby incorporated by reference.

BACKGROUND OF THE INVENTION

1. Field of the Invention

The present invention relates to an apparatus and method for transmitting and receiving time stamps to provide a multicast service in a communication system.

2. Description of the Related Art

Next-generation communication systems are evolving to provide various high-speed, high-capacity services to Mobile Stations (MSs). A typical example of the next-generation communication systems includes a Mobile Worldwide Interoperability for Microwave Access (WiMAX) communication system, which is a communication system based on the Institute of Electrical and Electronics Engineers (IEEE) 802.16 standard.

Meanwhile, the next-generation communication systems offer a multicast service as one of their representative services. A variety of schemes have been developed to support the multicast service, and the most typical one of them is patching, which is described below with reference to FIG. 1.

Figure 1:
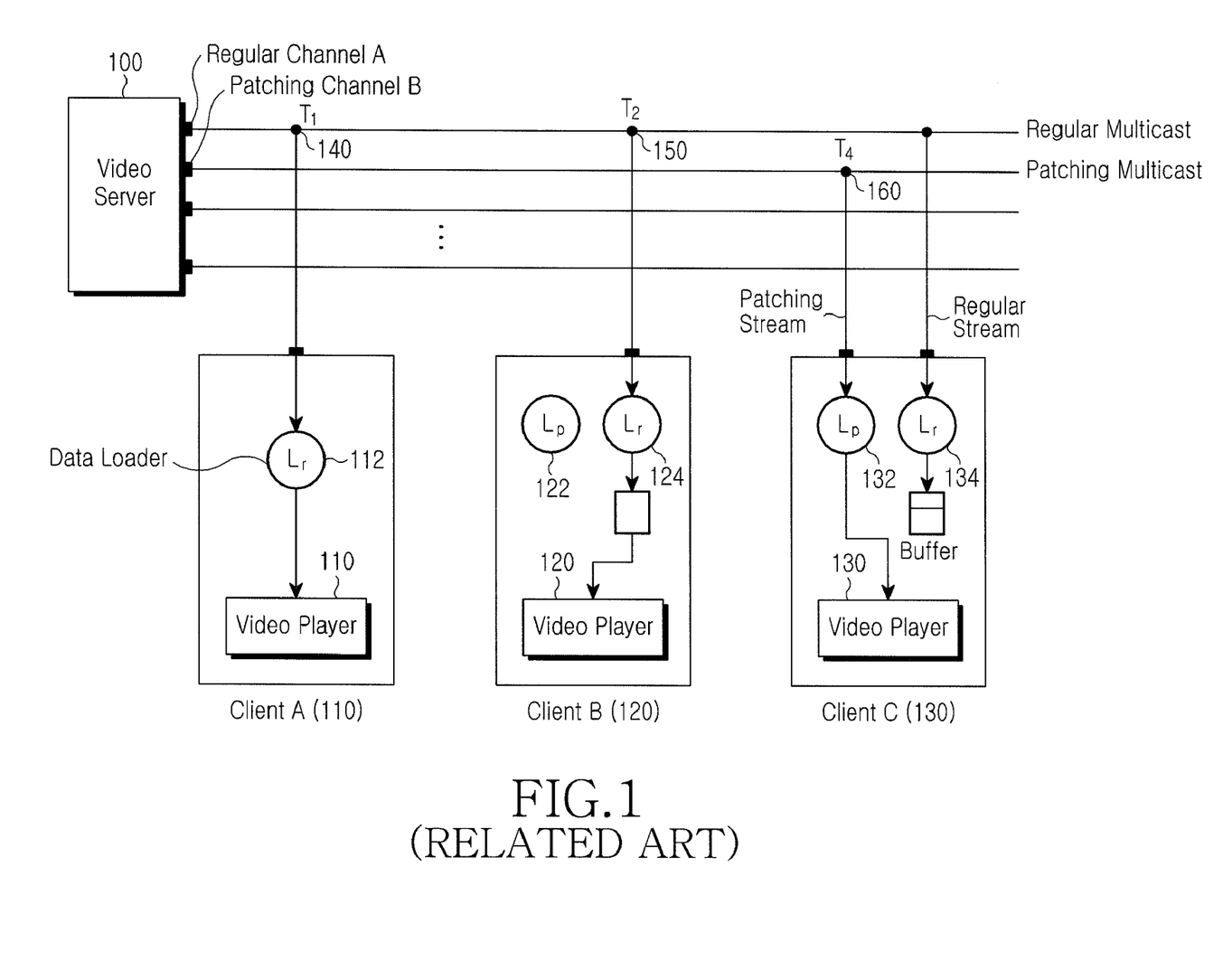
FIG. 1 schematically illustrates a process of processing multicast service data in a general communication system using a patching technique.

FIG. 1 schematically illustrates a process of processing multicast service data in a general communication system using a patching technique.

Referring to FIG. 1, the communication system includes a video server 100, and a group of clients: a client_A 110, a client_B 120 and a client_C 130. The video server 100 provides a multicast service, e.g. a real-time video service, and the client_A 110, the client_B 120 and the client_C 130 may request data of the same content, e.g. content A, from the video server 100 at different times.

The video server 100 has two channels—a regular channel A and a patching channel B—to provide data of the real-time video service to the clients.

Among the clients_A~C 110~130 that request data of the content A from the video server 100 at different times, the client_A 110 receives data of the content A from the video server 100 at time T1, which is the earliest time. Since the client_A 110 receives the data of the content A from the video server 100 at the earliest time, the client_A 110 receives the content data over only the regular channel A of the video server 100. Therefore, the client_A 110 has a data loader 112, which is dedicated to the data of the content A received over the regular channel A. The client_B 120 receives the data of the content A from the video server 100 over only the regular channel A at time T2 following the time T1. The client_B 120 has separate data loaders 122 and 124, which are dedicated to content data received over the patching channel B and the regular channel A, respectively.

Meanwhile, the client_C 130 receives the data of the content A from the video server 100 over the patching channel B at the latest time T4. In this case, it is assumed that another transmission for the data of the content A, which has progressed up to T4, is already on the regular channel A. At this point, the client_C 130 receives the transmission that has already progressed up to T4 over the regular channel A while receiving the transmission for a data start part of the content A over the patching channel B, and buffers the received data. Thereafter, in this technique, when a playback time for the data of the content A reaches a time following the time T4, the client_C 130 outputs the data buffered through the regular channel A, without separately receiving the data part of the content A from the patching channel B after the time T4. Here, the client_C 130 has separate data loaders 132 and 134, which are dedicated to the regular channel A and the patching channel B, respectively.

The above-described patching technique enables real-time services and makes it possible to receive data in many transmission periods in a multicast manner, thereby reducing duplicate transmission periods and saving resources needed for data transmission in the duplicate periods.

However, the patching technique undesirably suffers from an increase in transmission of a control channel for separately providing information about resources to be buffered to each user. In particular, when the resources to be buffered increase in number, a size of a control channel message also increases because of a need to transmit information about all of the resources. Therefore, an alternative scheme can also be considered that simply provides Connection Identification (CID) information of terminals, which corresponds to the resources to be buffered. In this case, since there may exist other data of a specific user, which is transmitted in accordance with the same CID, the related content information should be filtered out, which undesirably causes an increase in memory size and computation for buffering.

In conclusion, there is a need for an efficient multicast resource allocation information transmission method capable of reducing an overhead of a control channel by efficiently acquiring and buffering information about a signal corresponding to the data at a future time for which buffering for the same content is to be conducted, without explicitly transmitting information about buffering-target resources (or resources subjected to buffering) to individual users.

SUMMARY OF THE INVENTION

An aspect of the present invention is to address at least the above-mentioned problems and/or disadvantages and to provide at least the advantages described below. Accordingly, an aspect of the present invention provides an apparatus and method for allocating a multicast Connection Identifier (CID) and time stamps for resource allocation information of multicast data that each terminal will buffer in a communication scheme that previously buffers and stores resources corresponding to a future time of the same content, when there are a plurality of terminals that request data transmission for the same content at different times in a communication system.

Another aspect of the present invention provides an apparatus and method capable of reducing waste of resources for individual transmission of buffering-target resource information by allocating time stamps corresponding to a data transmission time to a plurality of terminals requiring transmission of the same content at different times in a communication system.

According to one aspect of the present invention, there is provided a method for transmitting a time stamp to provide a real-time multicast service by a base station in a communication system. The method includes, upon receipt of a multicast service request from a first terminal, determining whether a second terminal exists that was receiving data of the multicast service before the multicast service request is received from the first terminal; determining whether the base station is transmitting the multicast service data to the second terminal in a unicast manner when the second terminal exists; allocating a first multicast Connection Identifier (CID) and a first time stamp of an earliest order to the second terminal when the base station is transmitting the multicast service data to the second terminal in a unicast manner; after allocating the first time stamp to the second terminal, allocating the first multicast CID and a second time stamp having a next earliest order to the first terminal; and transmitting the first time stamp and the second time stamp using a resource allocation message. Preferably, the first time stamp and the second time stamp represent different playback times of the multicast service data.

According to another aspect of the present invention, there is provided a method for receiving a time stamp to provide a real-time multicast service by a terminal in a communication system. The method includes sending a multicast service request to a base station; receiving a resource allocation message including a first multicast Connection Identifier (CID) for the multicast service request and a time stamp, allocated from the base station; determining a data reception period of the multicast service for which the terminal should perform buffering according to a playback time of data of the multicast service, which is represented by the time stamp value, using the resource allocation message; and receiving the data of the multicast service corresponding to the data reception period. Preferably, the resource allocation message includes all time stamps allocated to the first multicast CID, and a playback time of the data of the multicast service, which is mapped to each of all the time stamps and represents a different value.

According to further another aspect of the present invention, there is provided an apparatus for transmitting a time stamp to provide a real-time multicast service in a communication system. The apparatus includes a base station for receiving a multicast service request from a first terminal, determining whether a second terminal exists that was receiving data of the multicast service before the multicast service request is received from the first terminal, determining whether the multicast service data is being transmitted to the second terminal in a unicast manner when the second terminal exists, allocating a first multicast Connection Identifier (CID) and a first time stamp of an earliest order to the second terminal when the multicast service data is being transmitted in a unicast manner, allocating the first multicast CID and a second time stamp having a next earliest order to the first terminal, and transmitting the first time stamp and the second time stamp using a resource allocation message. Preferably, the first time stamp and the second time stamp represent different playback times of the multicast service data.

According to yet another aspect of the present invention, there is provided an apparatus for receiving a time stamp to provide a real-time multicast service in a communication system. The apparatus includes a terminal for sending a multicast service request to a base station, receiving a resource allocation message including a first multicast Connection Identifier (CID) for the multicast service request and a time stamp, allocated from the base station, determining a data reception period of the multicast service for which the terminal should perform buffering according to a playback time of data of the multicast service, which is represented by the time stamp value, based on the resource allocation message, and receiving the data of the multicast service corresponding to the data reception period. Preferably, the resource allocation message includes all time stamps allocated to the first multicast CID, and a playback time of the data of the multicast service, which is mapped to each of all the time stamps and represents a different value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention provides an apparatus and method for allocating time stamps and transmitting and receiving multicast service to provide a multicast service in a communication system.

Figure 2:
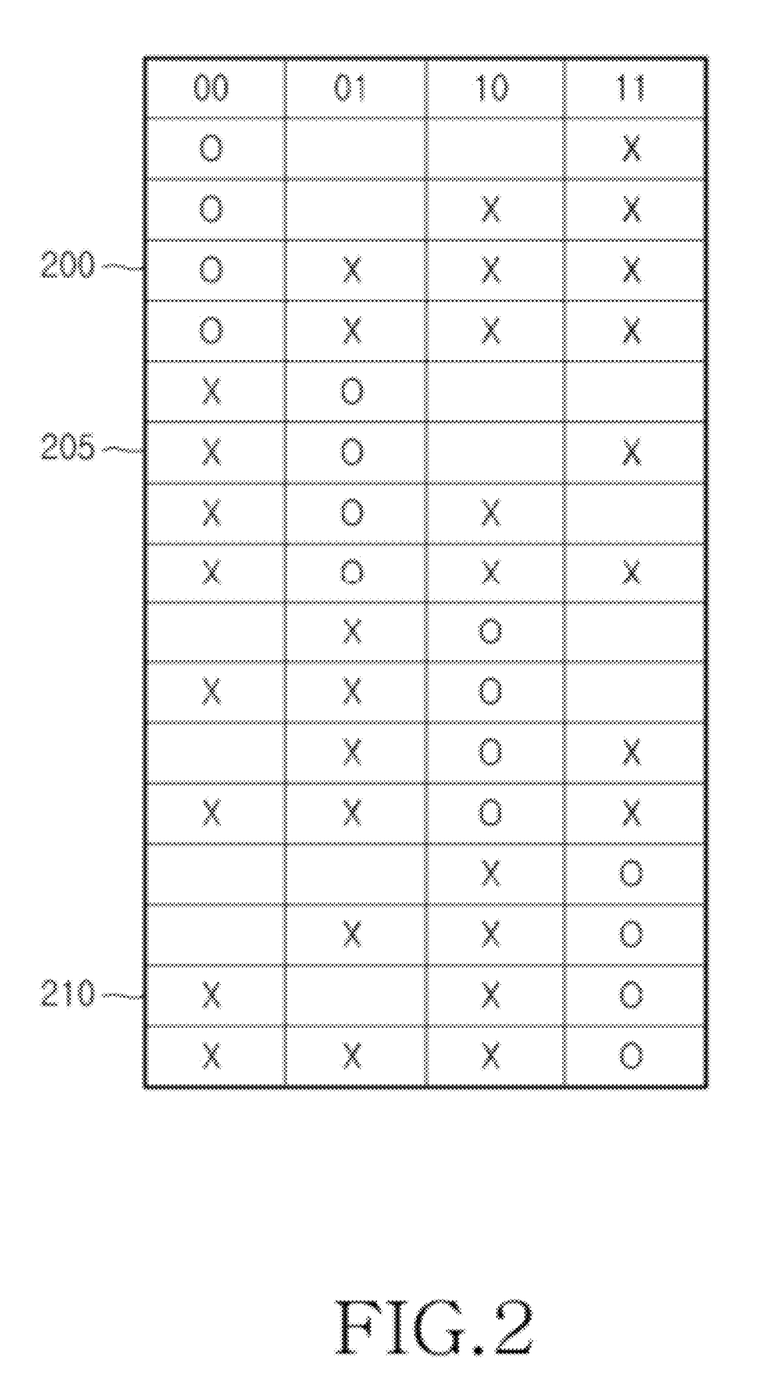
FIG. 2 illustrates exemplary time stamps allocated to provide a multicast service in a communication system according to an exemplary embodiment of the present invention.

FIG. 2 illustrates exemplary time stamps allocated to provide a multicast service in a communication system according to an exemplary embodiment of the present invention. It is assumed herein that one multicast Connection Identifier (CID) is allocated for one content and 4 time stamps are allocated for the multicast CID in the communication system.

Referring to FIG. 2, '00', '01', '10' and '11' are values of time stamps. The present invention allocates time stamps in accordance with a time stamp allocation rule in which the values of the time stamps are allocated to be circulated from left to right. In an embodiment of the present invention, a plurality of multicast CIDs can be allocated for the same content. The allocation of the multicast CIDs is determined according to presence/absence of time stamps allocable for individual multicast CIDs. That is, at first, one multicast CID is allocated for a specific content, and data of the content is provided using the one multicast CID and its associated time stamps. In the meanwhile, if the time stamps allocable in the one multicast CID are all in use, a new multicast CID is additionally allocated for the data of the content.

The table illustrated in FIG. 2 shows time stamps allocable for one multicast CID that is allocated to one content. It will be assumed in FIG. 2 that for example, 16 terminals requested content data for the same content using the same multicast CID. In FIG. 2, an 'x' mark indicates that the related time stamp is already allocated, while an 'o' mark indicates that the related time stamp is newly allocable. For example, when the time stamp '00' is already allocated, it is marked with 'x', and when the time stamp '00' is newly allocable, it is marked with 'o'. As a result, the time stamp allocation rule proposed by the present invention allocates time stamps such that currently unallocated time stamps are allocated to be circulated beginning from a time stamp with the smallest value in order of an early or late playback time of content data for the same content. When a time stamp is newly allocated, it cannot jump the already allocated time stamps during its allocation. If the time stamps are allocated in this manner, the total number of cases regarding the time stamp combinations allocable to each allocated multicast CID is determined by $$N_{time\_stamp} * 2^{(N_{time\_stamp}-2)},$$

where $N_{time\_stamp}$ denotes the total number of time stamp values.

More specifically, in accordance with a normal allocation rule, time stamps are sequentially allocated in order of "00"→"01"→"10"→"11" and values of the time stamps are associated with sequences of data playback times of the same content, respectively. Therefore, since data transmission for the same content is terminated in order of "00"→"01"→"10"→"11", the allocated time stamps are de-allocated in order of "00"→"01"→"10"→"11". That is, no unused time stamp exists between two consecutive time stamps.

However, unused time stamps may exist between allocated time stamps as indicated by reference numerals 200, 205 and 210 in an actual service process of the same content. This is equivalent to the case where data transmission for the same content, which corresponds to the unused time stamps, is terminated without the data being fully transmitted. This event may occur when a user closes, for example, one-hour content after viewing it only for ten minutes as he dislikes the content, or when a user who was assigned unused time stamps performs handover to another base station.

For example, in a case where new time stamps should be additionally allocated to new terminals after the time stamps are allocated as indicated by reference numerals 200, 205 and 210, if unused time stamps are allocated as new time stamps, they should be allocated jumping the already allocated time stamps, violating the allocation rule. As an example, since '00' is the last allocated time stamp with regard to a terminal that is allocated time stamps as indicated by reference numeral 200, '01' should be allocated next. However, if an unused time stamp value '10' is allocated as a new time stamp value as the '01' is a value of an already used time stamp, the time stamp is allocated jumping the '01', violating the allocation rule of the present invention.

If there are unused time stamps but none of them can be sequentially allocated as described above, a base station transmits a time stamp reset message to the terminal. Then the terminal updates allocation of the time stamps in accordance with indication of the time stamp reset message.

The time stamp reset message indicates update of time stamp allocation as follows.

First, the base station includes only a 'time stamp readjust command' in the time stamp reset message.

In this case, all terminals that are allocated the same multicast CID acquire resource allocation information for the same content, which is allocated to this CID, by decoding a resource allocation message such as previously received MAP. More specifically, based on the resource allocation information, all the terminals each acquire a playback time of the data corresponding to each of all allocable time stamps and acquire information about the currently used time stamps among all the allocable time stamps. That is, each of all the terminals has previously acquired and recognized data playback times of the same content regarding the currently used time stamps. Upon receiving a time stamp readjust command through the time stamp reset message, each terminal inversely shifts a time stamp value by the number of unused time stamps between a reference time stamp and a time stamp allocated to the terminal.

For example, when time stamps are allocated as indicated by reference numeral 200, each of all terminals allocated the multicast CID has recognized a time stamp corresponding to data of the same content, a playback time of which is earliest, among the previously allocated and used time stamps, at the time when time stamps are allocated to the terminal itself. Therefore, since each terminal recognizes that a value of the time stamp where the data of the same content is transmitted earliest is "01" and also recognizes the currently used time stamps, the terminal knows the fact that "10" is an unused time stamp value. Accordingly, if a particular terminal having a time stamp allocation sequence falling behind "10", among the terminals whose time stamp allocation sequences fall behind "01", receives a readjust command from the base station, the particular terminal inversely shifts the time stamp value by the number, i.e. 1, of the unused time stamps to readjust allocation sequences of the time stamps to '11'→'10' and '00'→'11'. Thereafter, the time stamp value '00' is de-allocated. Thus, upon receiving a data transmission request for the same content from a new terminal, the base station allocates the '00' as a time stamp value of the new terminal.

Second, values of time stamps whose allocation sequences should be readjusted and the number of time stamps that should be shifted are transmitted along with the time stamp reset message.

For example, when time stamps are allocated as indicated by reference numeral 200, values of reference time stamps whose allocation sequences should be readjusted and the number of time stamps that should be shifted, such as a value "11" of a time stamp whose allocation sequence should be readjusted and the number "1" of time stamps that should be shifted, and similarly, "00" and "1", are explicitly notified to a specific terminal.

That is, even though information about time stamps that should be buffered is not explicitly transmitted to each terminal, in order to allow the terminal to know the data at a future time for which it should perform buffering, the present invention uses the time stamp allocation rule that necessarily matches allocation sequences of time stamps and sequences of playback times of the content. For example, the following description will be made in connection with a terminal that is allocated time stamps as shown in the second row of FIG. 2. A base station allocates a multicast CID of the same content and a time stamp having a value of "00" to the terminal. Thereafter, based on a downlink control channel, the terminal may check information about all resources allocated to the multicast CID. More specifically, since it is possible to check that "10" and "11" are already allocated time stamps, and both of these two values are time stamps that were allocated earlier than "00", the terminal can indirectly determine even without transmission of a separate message the fact that it should receive and buffer data corresponding to the time stamp values of "10" and "11", in addition to the data corresponding to the time sample value of "00". Meanwhile, as regards a user which is buffering the data corresponding to the time stamp value of "10" while receiving the data corresponding to the time stamp value of "11" after it was already allocated the time stamp value of "11", if a time stamp "00" is additionally allocated, the user does not buffer data corresponding thereto because the time stamp "00" is a time stamp value corresponding to the data that the user has already played back or completely received.

Figure 3:
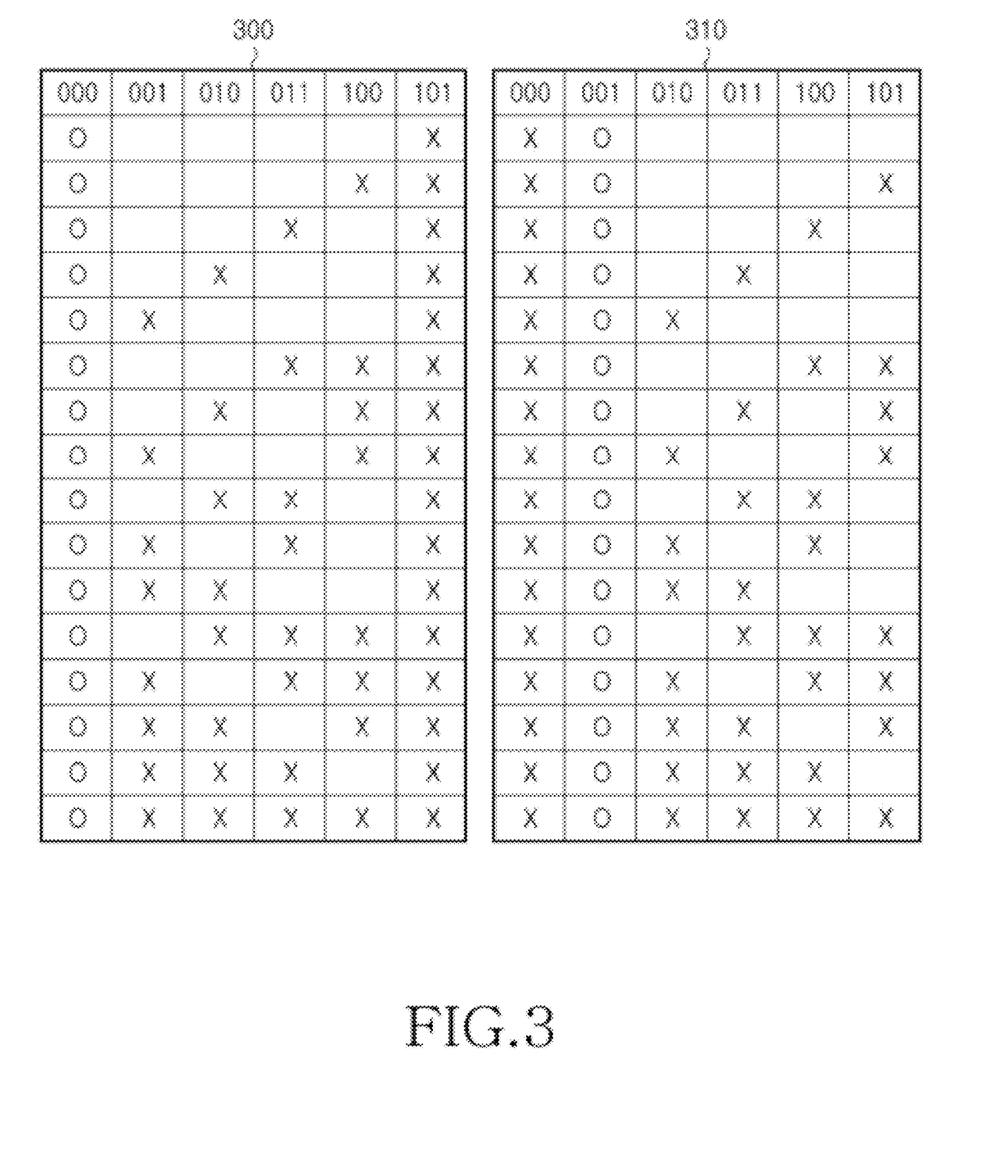
FIG. 3 illustrates time stamps allocated to each data at different times with regard to the same content according to an exemplary embodiment of the present invention.

FIG. 3 illustrates time stamps allocated to each data at different times with regard to the same content according to an exemplary embodiment of the present invention. Herein, it will be assumed that 6 time stamps are allocated for the same content.

Referring to FIG. 3, in this case, the number of cases of allocated time stamps becomes 6×16, which is a product of the total number 6 of time stamps and the total number 16 of multiple terminals requesting data of the same content. Tables 300 and 310 enumerate, as examples, only the cases where time stamps with a value of "000" and time stamps with a value of "001" are newly allocated, among a number of cases of allocated time stamps. Since the time stamp allocation method and readjustment theory are the same as those in FIG. 2, a detailed description thereof will be omitted herein.

Figure 4:
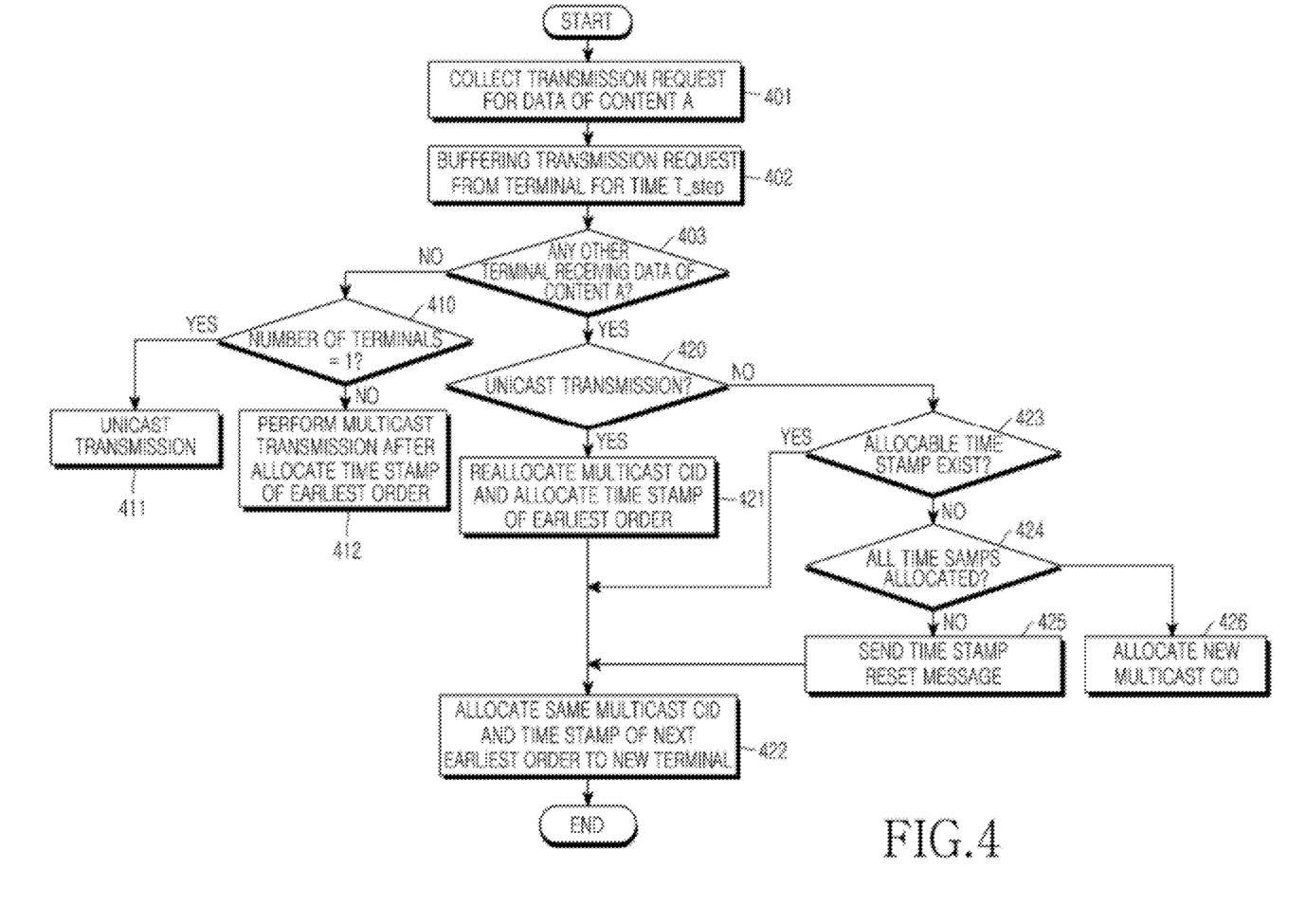
FIG. 4 illustrates a procedure for transmitting multicast resource allocation information by a base station in a communication system using a patching technique according to an exemplary embodiment of the present invention.

FIG. 4 illustrates a procedure for transmitting multicast resource allocation information by a base station in a communication system using a patching technique according to an exemplary embodiment of the present invention.

Referring to FIG. 4, a base station collects a data transmission request for a content A from at least one new terminal in step 401, and buffers the transmission request from the at least one new terminal for a predetermined time T_step in step 402. T_step is set to "0" when the terminal requests a real-time service.

In step 403, the base station checks if there is any other terminal already receiving data of the content A. If there is no other terminal, the base station determines in step 410 whether the number of new terminals requesting data transmission for the content A is 1. If the number of new terminals is 1, the base station transmits data of the content A to the new terminal in a unicast manner in step 411. However, if the number of new terminals exceeds 1, the base station allocates the same multicast CID and a time stamp of the earliest order to each of the new terminals and transmits data of the content A in a multicast manner in step 412.

If it is determined in step 403 that there is other terminal already receiving data of the content A, the base station determines in step 420 whether the other terminal was receiving data of the content A in a unicast manner. If the other terminal was receiving data of the content A in a unicast manner, the base station allocates the same multicast CID and a time stamp of the earliest order to the other terminal receiving the content A in a unicast manner in step 421. In step 422, the base station allocates the same multicast CID and a time stamp of the next earliest order to a new terminal requesting data of the content A. That is, all terminals receiving data of the content A have the same multicast CID, and differ in time stamp values depending on to which of the data playback times of the content A the data they are receiving corresponds.

However, if it is determined in step 420 that the other terminals are receiving data of the content A in a multicast manner, the base station determines in step 423 whether there exist allocable time stamps. If there are allocable time stamps, the base station allocates, to the new terminal, the same multicast CID and a next-earliest order time stamp with respect to the time stamp of the earliest order allocated to the terminal that receives data of the content A in a unicast manner, in step 422.

However, if there are no allocable time stamps in step 423, the base station determines in step 424 whether all time stamps have already been allocated. If all time stamps have been allocated, the base station allocates a new multicast CID to the new terminal in step 426, since there is no time stamp to be additionally allocated. If it is determined that there are unused time stamps but they violate the allocation rule of the present invention, the base station sends a time stamp reset message to the new terminal, and resets sequences of the currently allocated time stamps to secure allocable time stamps in step 425. Thereafter, the base station allocates the same multicast CID and the secured time stamps to the new terminal in step 422.

Figure 5:
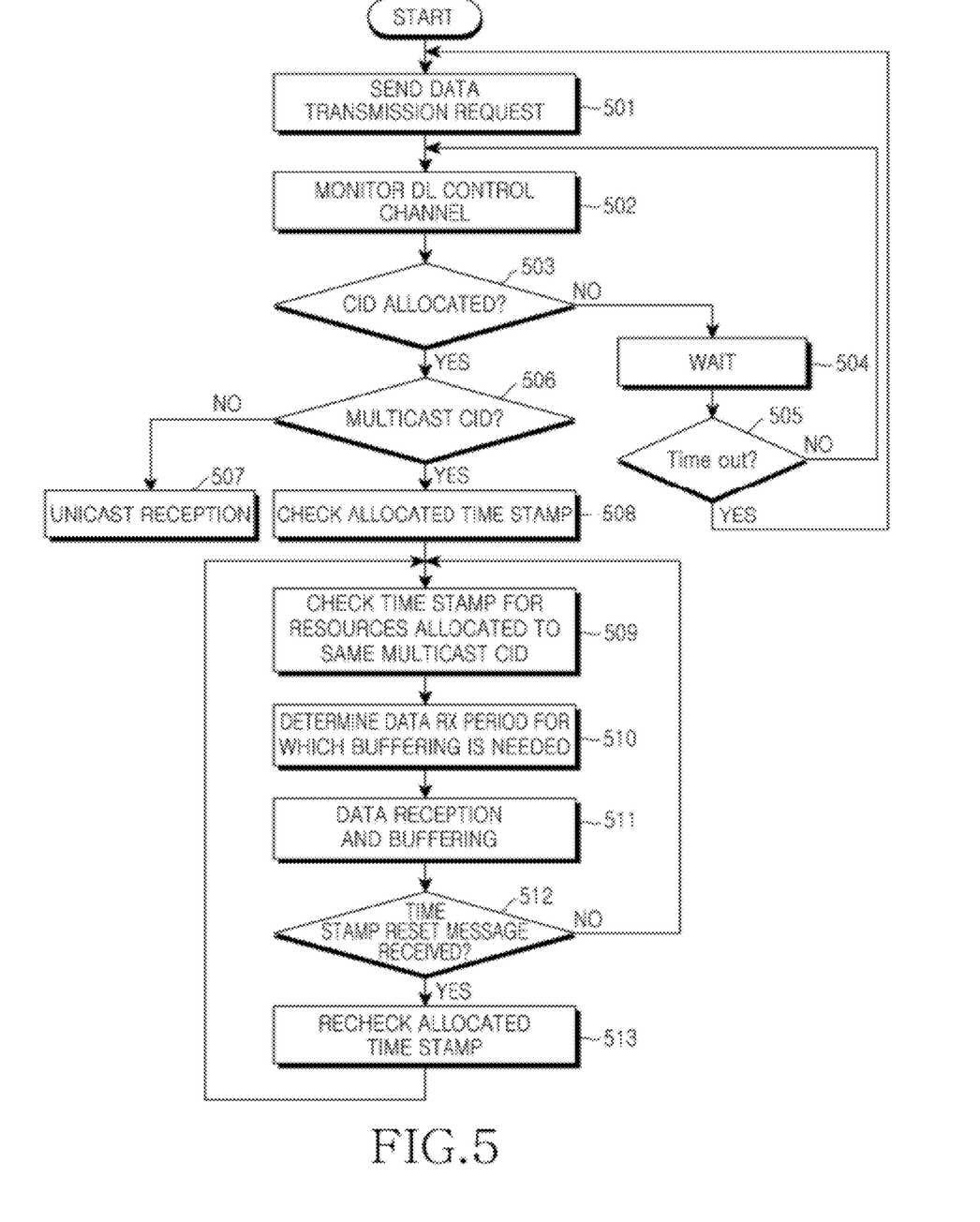
FIG. 5 illustrates a procedure for acquiring buffering-target resource information and receiving associated data by a terminal in a communication system using a patching technique according to an exemplary embodiment of the present invention.

FIG. 5 illustrates a procedure for acquiring buffering-target resource information and receiving associated data by a terminal in a communication system using a patching technique according to an exemplary embodiment of the present invention.

Referring to FIG. 5, a terminal sends a data transmission request for a content A to a base station in step 501, and waits for a response to the transmission request from the base station by monitoring a downlink control channel in step 502.

In step 503, the terminal determines whether a CID has been allocated from the base station in response to the data transmission request for the content A. If no CID has been allocated, the terminal waits for a CID to be allocated from the base station in step 504. The terminal determines in step 505 whether the wait time exceeds a predetermined maximum wait time. If the wait time exceeds the maximum wait time, the terminal returns to step 501 where it sends a retransmission request for the content A. However, if the wait time has not exceeded the maximum wait time, the terminal continuously monitors whether a CID is allocated.

If it is determined in step 503 that a CID is allocated in response to the data transmission request for the content A, the terminal determines in step 506 whether the allocated CID is a unicast CID or a multicast CID. If the allocated CID is a unicast CID, the terminal receives data of the content A in a unicast manner in step 507.

If the allocated CID is a multicast CID, the terminal checks a time stamp allocated from the base station in step 508. The terminal checks a time stamp for resources allocated to the multicast CID in step 509, and indirectly determines a data reception period for which it should perform buffering according to the allocated time stamp value in step 510. Here, the terminal has previously recognized the data reception period for which it should perform buffering according to the time stamp value based on a resource allocation message such as previously received MAP.

The terminal buffers and stores data corresponding to the allocated time stamp value in step 511, and periodically monitors in step 512 whether a time stamp reset message is received or not. If the time stamp reset message is received, the terminal rechecks the present condition of the reallocated time stamps in step 513. If the time stamp reset message is not received, the terminal returns to step 509. The time stamp reset message includes only a time stamp readjust command, or explicitly includes time stamp values that need readjustment and the number of time stamps to be shifted. The terminal operates according to the included information, and its operation has been described in FIG. 2.

As is apparent from the foregoing description, in a communication system using the patching technique that previously buffers data corresponding to a future time of the same content, the present invention allocates a multicast CID and time stamps, with which each terminal can determine the resources that it should buffer independently, without explicitly transmitting information about resources to be buffered to each terminal. Thus, each terminal can correctly acquire resource information it should buffer, even though a separate message for resources to be buffered is not transmitted to each terminal, making it possible to minimize a transmission overhead of a control channel.

Exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, Read-Only Memory (ROM), Random-Access Memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a time stamp to provide a real-time multicast service by a base station in a communication system, the method comprising:
   (1) upon receipt of a multicast service request from a first terminal, determining whether a second terminal exists that was receiving data of the multicast service before the multicast service request is received from the first terminal;
   (2) determining whether the base station is transmitting the multicast service data to the second terminal in a unicast manner when the second terminal exists;
   (3) allocating a first multicast Connection Identifier (CID) and a first time stamp of an earliest order to the second terminal when the base station is transmitting the multicast service data to the second terminal in a unicast manner;
   after allocating the first time stamp to the second terminal, allocating the first multicast CID and a second time stamp having a next earliest order to the first terminal; and
   transmitting the first time stamp and the second time stamp using a resource allocation message;
   wherein the first time stamp and the second time stamp represent different playback times of the multicast service data.

2. The method of claim 1, wherein each of the first time stamp and the second time stamp is represented by any one of a preset number of values, and allocated according to an allocation rule in which time stamps are sequentially allocated beginning from a smallest value among currently unallocated values out of the preset number of values in order of an early or late playback time of the multicast service data, and when a currently allocated value exists between the currently unallocated values, no time stamp is allocated jumping the currently allocated value.

3. The method of claim 2, further comprising:
   determining whether the currently unallocated value exists, when the data of the multicast service is transmitted to the second terminal in a multicast manner in the step (2); and
   allocating the first multicast CID and the second time stamp to the first terminal, when the currently unallocated value exists.

4. The method of claim 3, further comprising:
   (4) checking whether the preset number of values have all been allocated, when the currently unallocated value does not exist; and
   allocating a second multicast CID to the first terminal, when the preset number of values have all been allocated in step (4);
   wherein the second multicast CID is different from the first multicast CID.

5. The method of claim 4, further comprising:
   sending a time stamp reset message to the first terminal, when the preset number of values have not all been allocated in step (4);
   wherein the time stamp reset message includes a time stamp readjust command or a value of a reference time stamp whose allocation sequence should be readjusted, and a number of time stamps that should be shifted.

6. The method of claim 5, wherein the time stamp readjust command is a value defined to inversely shift a specific time stamp by a number of unused time stamps between the reference time stamp and the second time stamp.

7. The method of claim 1, further comprising:
   determining a number of the first terminals, when the second terminal does not exist in step (1);
   transmitting the data of the multicast service in a unicast manner, when the number of the first terminals is 1; and
   transmitting the data of the multicast service in a multicast manner after allocating the first multicast CID and the first time stamp to each of the first terminals, when the number of the first terminals is greater than or equal to 2.

8. A method for receiving a time stamp to provide a real-time multicast service by a terminal in a communication system, the method comprising:
sending a multicast service request to a base station;
receiving a resource allocation message including a first multicast Connection Identifier (CID) for the multicast service request and a time stamp, allocated from the base station;
determining a data reception period of the multicast service for which the terminal should perform buffering according to a playback time of data of the multicast service, which is represented by the time stamp value, using the resource allocation message; and
receiving the data of the multicast service corresponding to the data reception period;
wherein the resource allocation message includes all time stamps allocated to the first multicast CID, and a playback time of the data of the multicast service, which is mapped to each of all the time stamps and represents a different value.

9. The method of claim 8, wherein the time stamp is represented by any one of a preset number of values, and allocated according to an allocation rule in which time stamps are sequentially allocated beginning from a smallest value among currently unallocated values out of the preset number of values in order of an early or late playback time of the multicast service data, and when a currently allocated value exists between the currently unallocated values, no time stamp is allocated jumping the currently allocated value.

10. The method of claim 9, further comprising:
determining whether a time stamp reset message is received from the base station;
wherein the time stamp reset message includes a time stamp readjust command or a value of a reference time stamp whose allocation sequence should be readjusted, and a number of time stamps that should be shifted.

11. The method of claim 10, wherein the time stamp readjust command is a value defined to inversely shift a specific time stamp by a number of unused time stamps between the reference time stamp and the time stamp.

12. A base station for transmitting a time stamp to provide a real-time multicast service in a communication system, the base station comprising:
a receiver for receiving a multicast service request from a first terminal;
a processor for determining whether a second terminal exists that was receiving data of the multicast service before the multicast service request is received from the first terminal, for determining whether the multicast service data is being transmitted to the second terminal in a unicast manner when the second terminal exists, for allocating a first multicast Connection Identifier (CID) and a first time stamp of an earliest order to the second terminal when the multicast service data is being transmitted in a unicast manner, and for allocating the first multicast CID and a second time stamp having a next earliest order to the first terminal; and
a transmitter for transmitting the first time stamp and the second time stamp using a resource allocation message, wherein the first time stamp and the second time stamp represent different playback times of the multicast service data.

13. The base station of claim 12, wherein each of the first time stamp and the second time stamp is represented by any one of a preset number of values, and allocated according to an allocation rule in which time stamps are sequentially allocated beginning from a smallest value among currently unallocated values out of the preset number of values in order of an early or late playback time of the multicast service data, and when a currently allocated value exists between the currently unallocated values, no time stamp is allocated jumping the currently allocated value.

14. The base station of claim 13, wherein the base station determines whether the currently unallocated value exists, when the data of the multicast service is transmitted to the second terminal in a multicast manner, and allocates the first multicast CID and the second time stamp to the first terminal, when the currently unallocated value exists.

15. The base station of claim 14, wherein the base station checks whether the preset number of values have all been allocated, when the currently unallocated value does not exist, and allocates a second multicast CID to the first terminal, when the preset number of values have all been allocated;
wherein the second multicast CID is different from the first multicast CID.

16. The base station of claim 15, wherein the base station sends a time stamp reset message to the first terminal, when the preset number of values have not all been allocated;
wherein the time stamp reset message includes a time stamp readjust command or a value of a reference time stamp whose allocation sequence should be readjusted, and a number of time stamps that should be shifted.

17. The base station of claim 16, wherein the time stamp readjust command is a value defined to inversely shift a specific time stamp by a number of unused time stamps between the reference time stamp and the second time stamp.

18. The base station of claim 12, wherein the base station determines a number of the first terminals when the second terminal does not exist, transmits the data of the multicast service in a unicast manner when the number of the first terminals is 1, and transmits the data of the multicast service in a multicast manner after allocating the first multicast CID and the first time stamp to each of the first terminals when the number of the first terminals is greater than or equal to 2.

19. A terminal for receiving a time stamp to provide a real-time multicast service in a communication system, the terminal comprising:
a transmitter for sending a multicast service request to a base station;
a receiver for receiving a resource allocation message including a first multicast Connection Identifier (CID) for the multicast service request and a time stamp, allocated from the base station, and for receiving the data of the multicast service corresponding to a data reception period;
a processor for determining the data reception period of the multicast service for which the terminal should perform buffering according to a playback time of data of the multicast service, which is represented by the time stamp value, based on the resource allocation message,
wherein the resource allocation message includes all time stamps allocated to the first multicast CID, and a playback time of the data of the multicast service, which is mapped to each of all the time stamps and represents a different value.

20. The terminal of claim 19, wherein the time stamp is represented by any one of a preset number of values, and allocated according to an allocation rule in which time stamps are sequentially allocated beginning from a smallest value among currently unallocated values out of the preset number of values in order of an early or late playback time of the multicast service data, and when a currently allocated value exists between the currently unallocated values, no time stamp is allocated jumping the currently allocated value.

21. The terminal of claim 20, wherein the terminal receives a time stamp reset message from the base station;
   wherein the time stamp reset message includes a time stamp readjust command or a value of a reference time stamp whose allocation sequence should be readjusted, and a number of time stamps that should be shifted.

22. The terminal of claim 21, wherein the time stamp readjust command is a value defined to inversely shift a specific time stamp by a number of unused time stamps between the reference time stamp and the time stamp.

* * * * *